Sept. 29, 1925.
J. F. O'CONNOR
1,555,696
FRICTION SHOCK ABSORBING MECHANISM
Filed Oct. 9, 1922
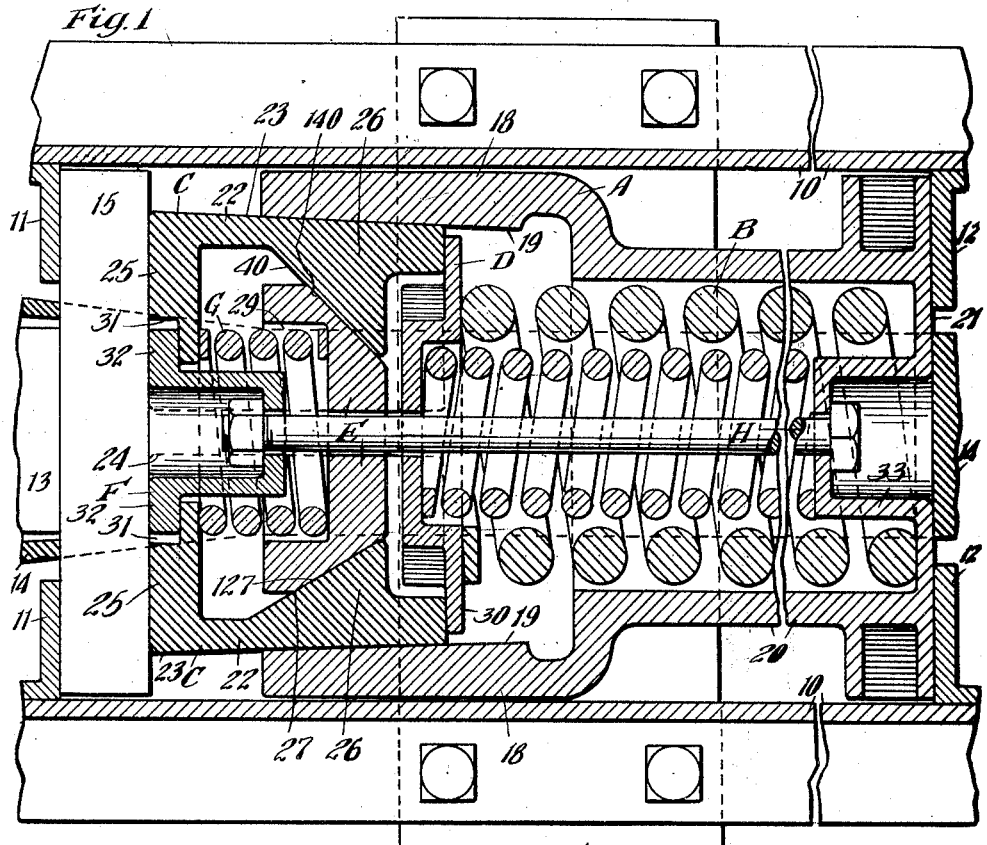
Inventor
John F. O'Connor
By Geo. I. Haight
His Atty.

Patented Sept. 29, 1925.

1,555,696

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed October 9, 1922. Serial No. 593,188.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a friction shock absorbing mechanism especially adapted for railway draft riggings and wherein are obtained high capacity and easy release, the mechanism consisting of relatively few parts, each of simple and economical construction.

A specific object of the invention is to provide a mechanism of the character indicated wherein the arrangement of friction creating elements and the usual spring resistance is such that there will be a gradual augmentation of the frictional resistance during a compression stroke independent of the gradually increasing resistance from the main spring.

Other objects of the invention will more clearly appear from the description and claims hereinafter following.

In the drawing forming a part of this specification, Figure 1 is a horizontal, longitudinal, sectional view of a portion of a railway draft rigging showing my improvements in connection therewith, parts being broken away in order to better accommodate the figure on the sheet. Figure 2 is a front end elevation of the shock absorbing mechanism proper. And Figure 3 is a detail perspective of one of the friction shoes.

In said drawing, 10—10 denote channel draft sills of a car underframe, to the inner faces of which are secured front stop lugs 11 and rear stop lugs 12. A portion of a drawbar is indicated at 13, the same being connected to a hooded cast yoke 14 within which is disposed the shock absorbing mechanism proper and a front follower 15. The yoke and parts therewithin are supported in operative position by a detachable saddle plate 16.

The improved shock absorbing mechanism proper, as shown, comprises a combined friction shell and spring cage casting A; a main spring resistance B; a pair of friction shoes C—C; a spring follower D; a wedge E; a bolt retainer cup F; a second spring G; and a retainer bolt H.

The casting A, as shown, is of rectangular outline at its front end, the same having top and bottom walls 17—17 and side walls 18—18. The inner faces of the side walls 18 are so formed as to provide flat rearwardly converging friction surfaces 19—19. Rearwardly of the rectangular shell proper, just described, the casting A is necked in so as to form a cylindrical section 20 which serves to house and center the spring resistance B. At the rear end, the casting A has an integral vertical wall 21 laterally extended and suitably braced so as to adapt it to function as the rear follower of the mechanism.

The two friction shoes C—C are of like construction, except as hereinafter described, each having a main vertical section 22, the outer face of which is formed to provide a friction surface 23 cooperable with the corresponding adjacent friction surface 19. At the top and bottom, each shoe C has inwardly extended horizontal flanges 24—24 and at the front end another inwardly extended vertical flange 25, of considerable thickness, adapting it to receive the actuating pressure from the front follower 15. On its inner side, each shoe C is provided with an enlargement 26. The enlargement 26 of one of the shoes C—the one shown at the bottom as viewed in Figure 1—is provided with a wedge face 27 extending rearwardly toward the axis of the mechanism at a comparatively acute angle. The enlargement 26 of the other shoe C is provided with a rearwardly inclined face 40 which extends at a comparatively blunt angle with respect to the axis of the mechanism.

The wedge E is provided on one side with an inclined face 127 corresponding in inclination to and cooperable with the wedge face 27 of the lower shoe C. On its other side, the wedge E is provided with an inclined face 140 cooperable with and extending at the same angle as the inclined face 40 of the other shoe. On its outer side, the wedge E has a cup-shaped recess 29 within which is seated one end of the spring G, the opposite end of the latter bearing against the inwardly extended flanges 25 of the shoes C. In this connection, it will be understood that the spring G is initially placed under compression so as to positively insure the wedge E being maintained in tight contact with the two shoes C.

The follower D is substantially cup-shaped, having lateral flanges 30 which engage the inner ends of the shoes C. The outer coil of the spring B bears on the flanges 30 and the inner coil is seated within a cup-shaped recess of the follower D.

As shown in Figures 1 and 3, the front transverse flanges of the shoes C are notched or cut away as indicated at 31 to accommodate the lateral flanges 32 of the cup-shaped bolt retainer F, the latter passing between the inturned flanges of the shoes C and having anchored therewithin the nut of the retainer bolt H. The head end of the bolt H is anchored within a cup-shaped boss 33 formed integral with the rear wall of the casting A.

The operation of the mechanism is as follows, assuming a compression stroke under buff. As the front follower 15 is moved inwardly, the two shoes C—C will obviously be forced rearwardly at the same rate. Due to the fact that the spring G is under initial compression, it is evident that there will be a spreading or wedging action laterally exerted upon the shoes at all times from the wedge E. As the friction unit moves inwardly, it will be resisted directly by the spring resistance B and in addition, due to the converging shell friction surfaces 19, the two shoes C will be crowded laterally toward each other. As this occurs, there will necessarily be a gradual outward movement of the wedge E with respect to the shoes C, thus further compressing the spring G and gradually augmenting the frictional resistance. In release, the spring B obviously acts directly upon the shoes C and will force the latter outwardly, this action being assured by reason of the taper of the friction shell surfaces 19. It will also be observed that all wear will be automatically compensated for by the spring G and wedge E, since the spring G is under an initial compression.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having inwardly converging friction surfaces; of friction shoes cooperable with said surfaces and adapted to receive the actuating pressure; a spring resistance; a wedge member between said shoes, said shoes and wedge member having interengaging wedge faces; and spring means independent of said spring resistance for yieldingly maintaining the wedge member in operative engagement with said shoes.

2. In a friction shock absorbing mechanism, the combination with a friction shell having inwardly converging friction surfaces; of friction shoes cooperable with said surfaces and adapted to receive the actuating pressure; a spring resistance; means for spreading said shoes apart, said means consisting of a single wedge between and co-acting with all of said shoes; and spring means independent of said spring resistance yieldingly maintaining said wedge in operative engagement with said shoes.

3. In a friction shock absorbing mechanism, the combination with a friction shell having inwardly converging friction surfaces; of friction shoes cooperable with said surfaces and adapted to receive the actuating pressure each of said shoes having a wedge face; a spring resistance; a wedge block coacting with the wedge faces of said shoes, said block being disposed between said shoes; and spring means interposed between said wedging means and the shoes for maintaining said wedge block in operative engagement with the shoes.

4. In a friction shock absorbing mechanism, the combination with a friction shell having inwardly converging friction surfaces; of friction shoes cooperable with said surfaces and adapted to receive the actuating pressure; a spring resistance; a single wedge interposed between and co-acting with all of said shoes; and a spring interposed between said wedge and the friction shoes, said spring being under initial compression and arranged to maintain said wedge in operative engagement with the shoes.

5. In a friction shock absorbing mechanism, the combination with a friction shell having interior friction surfaces; of friction shoes cooperable with said surfaces and adapted to directly receive the actuating force during the entire compression stroke of the mechanism; a main spring resistance coacting with said shoes; a single wedge member for spreading said shoes, said wedge member being housed within and cooperable with said friction shoes; and spring means co-acting with said wedge to maintain the latter in operative engagement with the shoes.

6. In a friction shock absorbing mechanism, the combination with a friction shell having interior friction surfaces; of a main follower, friction shoes cooperable with said surfaces said shoes being directly engaged by said follower and moved thereby during the entire compression stroke of the mechanism; a main spring resistance; a spreading means for said shoes, consisting of a single wedge housed within and cooperable with the friction shoes; and a spring interposed between said wedge and the friction shoes and arranged to maintain said wedge in operative engagement with the shoes.

In witness that I claim the foregoing I have hereunto subscribed my name this 21st day of September 1922.

JOHN F. O'CONNOR.